United States Patent [19]

Sickels

[11] Patent Number: 4,783,959
[45] Date of Patent: Nov. 15, 1988

[54] EXHAUST PROCESSOR ASSEMBLY
[75] Inventor: Mark A. Sickels, Columbus, Ind.
[73] Assignee: Arvin Industries, Inc., Columbus, Ind.
[21] Appl. No.: 99,557
[22] Filed: Sep. 22, 1987
[51] Int. Cl.[4] .............................................. F01N 3/08
[52] U.S. Cl. ..................................... 60/299; 422/116; 422/220
[58] Field of Search ................... 60/299; 422/176, 220

[56] References Cited

U.S. PATENT DOCUMENTS

| 3,189,418 | 6/1965 | Gary . | |
|---|---|---|---|
| 3,695,851 | 10/1972 | Perga . | |
| 3,780,772 | 12/1973 | Carnanhan et al. | 138/37 |
| 3,819,334 | 6/1974 | Yoshida et al. . | |
| 3,929,420 | 12/1975 | Wood . | |
| 4,002,433 | 1/1977 | Oser . | |
| 4,206,179 | 6/1980 | Oya et al. | 422/180 |
| 4,209,495 | 6/1980 | Kobayashi | 422/220 |
| 4,247,520 | 1/1981 | Worner | 422/176 |
| 4,625,511 | 12/1986 | Scheitlin et al. | 60/299 |
| 4,663,934 | 5/1987 | Sickels | 60/302 |

FOREIGN PATENT DOCUMENTS 0731005 4/1980 U.S.S.R. .

Primary Examiner—Douglas Hart
Attorney, Agent, or Firm—Barnes & Thornburg

[57] ABSTRACT

An exhaust processor assembly is provided for processing a flow of combustion product supplied by a source. The processor assembly has a housing including an inlet coupled to the source for admitting combustion product into the housing. The inlet includes first and second diverging nozzles interconnected by a transition section of uniform cross-section. A diverter is positioned in the inlet for interrupting the flow of combustion product traveling through the inlet toward the substrate. The specially configured inlet and the diverter cooperate to substantially uniformly distribute the flow of combustion product introduced into the housing across the inlet face of the substrate. Such uniform distribution provides a distributed exhaust flow designed to load the substrate substantially evenly to enhance combustion product treatment efficiency of the substrate means.

16 Claims, 6 Drawing Sheets

EXHAUST PROCESSOR ASSEMBLY

BACKGROUND AND SUMMARY OF THE INVENTION

The present invention relates to exhaust processor assemblies that are useable to process a combustion fluid. More particularly, the present invention relates to an inlet nozzle for an exhaust processor assembly which enables the inflow of combustion product to be distributed substantially evenly across the face of a substrate material without a significant buildup of back pressure due to the distribution of the flow.

Conventional exhaust processors generally include an inlet housing which is in communication with an exhaust manifold of an internal combustion engine and a monolithic substrate disposed within the processor to process various pollutants contained in a combustion product produced by the engine. Because of functional considerations, the size of the substrate is generally somewhat larger than the size of the exhaust conduit conducting the combustion product away from the engine. Because of this, problems arise in distributing the flow of the inflowing combustion product across a substantial portion of the surface of the substrate. It will be understood that it is advantageous to distribute the flow of combustion product as evenly as possible across the inlet face of the substrate to utilize the full capacity of the substrate and increase its useful life.

One object of the present invention is to provide an inlet for an exhaust processor assembly which provides for a substantially uniform distribution of the flow of the combustion product over the face of the substrate.

Another object of the present invention is to provide an inlet for an exhaust processor assembly which provides for a substantially uniform flow of the combustion product over the face of the substrate without significantly increasing the back pressure of the combustion product within the inlet.

Yet another object of the present invention is to provide an inlet for an exhaust processor assembly which provides for uniform flow distribution across the face of the substrate without increasing significantly the back pressure within the inlet and which is also easy to produce and manufacture.

According to the present invention, an exhaust processor assembly for processing a flow of combustion product supplied by a source means is provided. The processor assembly has a housing including inlet means coupled to the source means for admitting combustion product traveling in a certain flow direction into the housing and outlet means for exhausting combustion product from the housing.

The assembly also includes substrate means positioned in the housing in downstream relation to the inlet means for treating the combustion product admitted into the housing through the inlet means. The inlet means has a longitudinal axis that extends between the source means and the substrate means to define a predetermined axial dimension along the longitudinal axis.

The inlet means includes first diverging nozzle means communicating with the source means for providing an increase in the cross-sectional area of the inlet means in a flow direction over a first predetermined axial distance. The inlet means also includes second diverging nozzle means communicating with the substrate means for providing an increase in the cross-sectional area of the inlet means in the flow direction over a second predetermined axial distance. In addition, the inlet means includes transition means interconnecting the first and second diverging nozzle means in fluid communication for providing a substantially uniform cross-sectional area of the inlet means in the flow direction over a third predetermined axial distance. The summation of the first, second, and third predetermined axial distances is substantially equivalent to the predetermined axial dimension of the inlet means.

Diverter means is provided that is positioned in the inlet means for interrupting the flow of combustion product traveling through the inlet means toward the substrate means. The inlet means and the diverter means cooperating to provide distribution means for uniformly distributing the flow of combustion product introduced into the housing across the inlet face of the substrate. Such uniform distribution provides a distributed exhaust flow designed to load the entire volume of the substrate means substantially evenly to enhance combustion product treatment efficiency of the substrate means.

One feature of the foregoing structure is that the inlet means includes first and second diverging nozzle means for providing an increase in the cross-sectional area of the inlet means in the flow direction over a specified predetermined axial distance, and transition means interposed between the first and second diverging nozzle means for providing a substantially uniform cross-sectional area in the flow direction over a specified predetermined axial distance. One advantage of this feature is that by interposing a transition means with a substantially uniform cross-sectional area between first and second diverging nozzle means having increasing cross-sectional areas, the flow distribution of the combustion product flowing toward the substrate is enhanced.

Another feature of the foregoing structure is that diverter means is positioned in the inlet means to enhance the uniform distribution of the flow of the combustion product across the inlet face of the substrate. One advantage of this feature is that a distributed exhaust flow designed to load the entire volume of the substrate substantially evenly to enhance combustion product treatment efficiency is provided.

In preferred embodiments of the present invention, the first and second diverging nozzle means define first and third flow-conducting chambers, and the transition means defines a second flow-conducting chamber which is interposed between the first and third flow-conducting chambers. In addition, the diverter means is positioned in a portion of the first flow conducting chamber, or the second flow-conducting chamber, or may extend into a portion of these two chambers.

Also in preferred embodiments of the present invention, the first diverging nozzle means and the transition means cooperate to define an interface plane therebetween, and the diverter means is positioned such that it is substantially centered about the interface plane.

Also in preferred embodiments of the present invention, the source means is an inlet pipe which includes an open mouth having a specified cross-sectional area, and the diverter means includes a flow-interrupting member having a flow-receiving face and support means coupled to the inlet pipe for suspending the flow-interrupting portion in the inlet means in spaced relation to the inlet pipe open face. The flow-receiving face of the flow-interrupting member has a surface area that is substantially less than the specified cross-sectional area of the open mouth of the inlet pipe.

One feature of the foregoing structure is that the surface area of the flow-receiving face of the flow-interrupting member is substantially less than the cross-sectional area of the open mouth of the inlet pipe. One advantage of this feature is that the flow of combustion product from the inlet pipe toward the flow-receiving face does not increase the back pressure significantly in the inlet pipe.

In other preferred embodiments of the present invention, the flow-interrupting member is an elongated strap and the support means includes first and second elongated frame members situated in substantially spaced-apart parallel relation to each other. The first elongated frame member interconnects the inlet pipe and one end of the elongated strap, while the second elongated frame member interconnects the inlet pipe and the other end of the elongated strap.

One feature of the foregoing structure is that the first and second elongated frame members are connected directly to the inlet pipe and cooperate to support the elongated strap. One advantage of this feature is that the inlet pipe serves as the sole support for the flow-interrupting member, and the flow-interrupting member can be formed integrally with the inlet pipe to provide for an integral unit which is easier to manufacture.

Also in preferred embodiments of the present invention, the first predetermined axial distance is about 33-45% of the predetermined axial dimension. Also, the second predetermined axial distance is about 33-45% of the predetermined axial dimension, and the third predetermined axial distance is about 10-33% of the predetermined axial dimension. One feature of the foregoing structure is that the first, second, and third flow-conducting chambers are formed according to specified, predetermined requirements. One advantage of this feature is that, by forming the first, second, and third flow-conducting chambers according to specified requirements, the chambers cooperate with the diverting means to distribute the flow of combustion products substantially evenly across the face of the substrate.

Thus, the present invention provides an inlet for an exhaust processor assembly in which a specified contour of the sidewalls of the inlet defines specific relationships between cross-sectional areas of chambers within the inlet which, in combination with the location of a diverting means, cooperate to produce a substantially even flow of combustion product across the face of the substrate. By providing a chamber having substantially constant cross-sectional area interposed between two chambers having increasing cross-sectional area, and by placing the diverting means substantially near the interface between the first increasing cross-sectional area chamber and the constant cross-sectional area chamber, the flow pattern within the inlet is able to distribute the flow of combustion product to provide an even flow across the face of the substrate without increasing significantly the back pressure within the inlet or the source means.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE DRAWINGS

Figure 1:
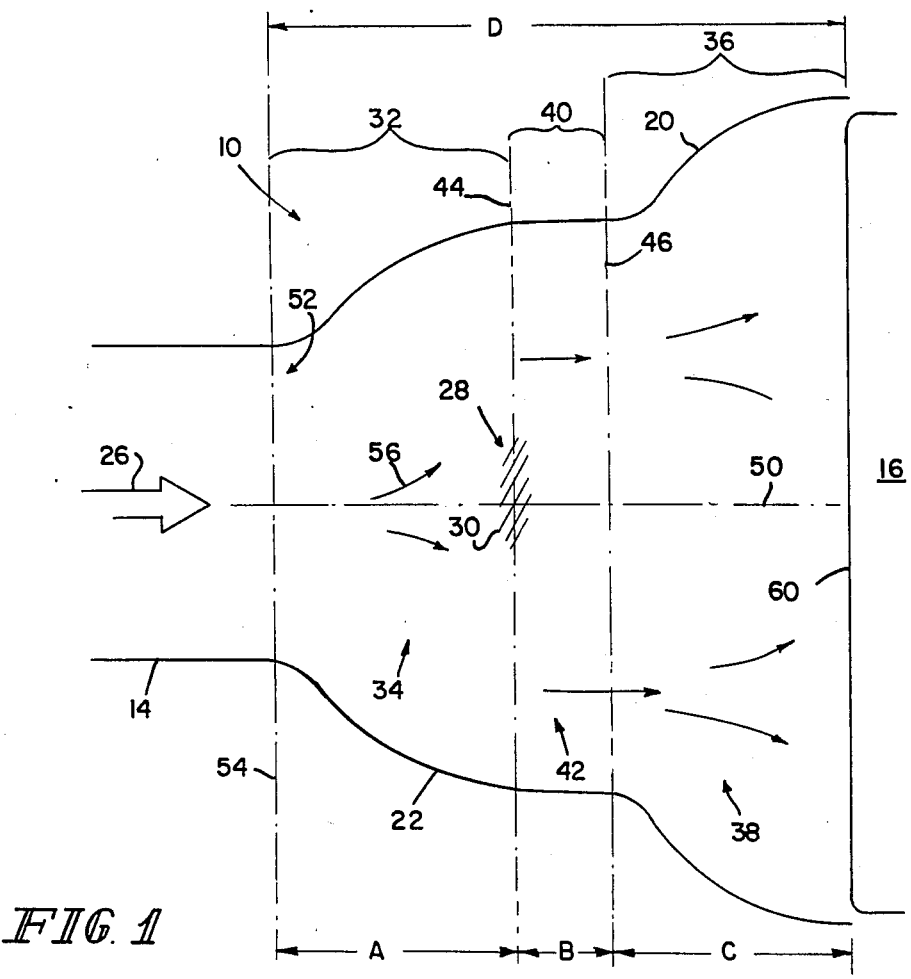
FIG. 1 is a diagrammatic illustration of an inlet nozzle showing the three sections of the nozzle and the placement of the flow diverting member.

Referring now to the drawings, FIG. 1 is a diagrammatic illustration of the concept of the present invention. Specifically, FIG. 1 illustrates an inlet nozzle 10 of an exhaust processor assembly (not shown in this figure). The inlet nozzle 10 is designed to be connected to an inlet pipe 14 which serves as a source means for conducting combustion product away from an internal combustion engine (not shown) to a substrate 16 that is enclosed within the exhaust processor assembly.

It will be understood that substrate 16 may be a monolithic cellular structure of conventional size. The substrate may be used as a catalytic reactor or as a diesel particulate trap without departing from the scope of the present invention. It will be further understood that, in referring to an exhaust processor assembly, such reference includes various types of reactors, catalytic converters and processors, diesel particulate filters, and other particulate traps in connection with which the inlet of the present invention may be used.

The inlet nozzle 10 includes a first contoured side wall 20 and an opposing second contoured side wall 22. Combustion product from the internal combustion engine flows from the engine through the inlet pipe 14 into the inlet nozzle 10, and is distributed and directed toward the substrate 16 by the inlet nozzle 10. The flow direction of the combustion material is indicated by the double arrow 26. A flow diverting member 28 is disposed within the interior of the inlet nozzle 10 which cooperates with the interior configuration of the inlet nozzle 10 to distribute and direct the combustion product toward the substrate 16. The flow diverting member 28 will normally be supported by support means (not shown in FIG. 1) to position the member 28 properly within the inlet nozzle 10. The flow diverting member 28 includes a flow-receiving face 30 which is oriented to confront the inflow of combustion product from the source or inlet pipe 14.

The contoured first and second sidewalls 20, 22, cooperate to define three distinct sections within the inlet nozzle 10. Specifically, a first diverging nozzle section 32 is formed at the most upstream portion of the inlet nozzle 10. The first diverging nozzle section 32 is configured to define a first flow-conducting chamber 34 within the inlet nozzle 10. Because of the contour of the first and second side walls 20, 22 in the first diverging nozzle section 32, the first flow-conducting chamber 34 is configured to have an increasing cross-sectional area in the direction of the flow direction arrow 26. Likewise, the first and second side walls 20, 22 cooperate to define a second diverging nozzle section 36 in the portion of the inlet nozzle 10 adjacent the substrate 16. The second diverging nozzle section 36 defines a third flow-conducting chamber 38 within the inlet nozzle 10. Like the first flow-conducting chamber 34, the third flow-conducting chamber 38 has an increasing cross-sectional area in the direction of the flow direction arrow 26.

A transition section 40 is interposed between the first diverging nozzle section 32 and the second diverging nozzle section 36. The transition section 40 defines a second flow-conducting chamber 42 within the inlet nozzle 10. The second flow-conducting chamber 42 is configured to have a substantially constant cross-sectional area in the direction of flow direction 26.

The first flow-conducting chamber 34, the second flow-conducting chamber 42, and the third flow-conducting chamber 38 are arranged sequentially from the inlet pipe 14 to the substrate 16. A first interface plane 44 is defined between the first flow-conducting chamber 36 and the second flow-conducting chamber 42, and a second interface plane 46 is defined between the second flow-conducting chamber 42 and the third flow-conducting chamber 38. The interface planes 44, 46 are illustrated by broken lines in FIG. 1.

A longitudinal axis 50 extends from the inlet pipe 14 to the substrate 16 as illustrated by the dashed line 50. The inlet nozzle 10 has a predetermined axial dimension along the longitudinal axis 50 that is illustrated by the dimension D in FIG. 1. It will be understood that the dimension D represents the axial dimension of the inlet nozzle 10 between an open mouth 52 of the inlet pipe 14 and the substrate 16. Specifically, the dimension D extends from a plane 54 which divides the open mouth 52 of the inlet pipe 14 and the first flow-conducting chamber 34 to the substrate 16.

The first diverging nozzle section 32 extends a first predetermined axial distance A from the plane 54 to the first interface plane 44. The second diverging nozzle section 36 extends a predetermined axial distance C from the second interface plane 46 to the substrate 16. The transition section 40 extends a third predetermined axial distance B from the first interface plane 44 to the second interface plane 46. Illustratively, the first predetermined axial distance A is about 33–45% of the predetermined axial dimension D. The second predetermined axial distance C is also about 33–45% of the predetermined axial dimension D. The third predetermined axial distance B is about 10–33% of the predetermined axial dimension D. It will be understood that the summation of the first, second, and third predetermined axial distances A, B, C, respectively, is substantially equal to the predetermined axial dimension D.

Ideally, the flow diverting member 28 may be disposed such that its center is approximately aligned with the first interface plane 44, with the flow-receiving face 30 oriented to face the inlet pipe 14 in confronting relation. Although the flow diverting member 28 may be moved axially somewhat along the axis 50 from this ideal location near the first interface plane 44, such movement is limited to a specific range such that the flow diverting member 28 should not extend into the second diverting nozzle section 36. Illustratively, the range of movement of the flow diverting member 28 from its location near the first interface plane 44 is limited to less than about 10 percent of dimension D in either direction from the position illustrated in FIG. 1.

By dividing the inlet nozzle 10 into three distinct sections, with the cross-sectional area in each section regulated according to specific, predetermined requirements, and by accurately locating the flow diverting member 28 with respect to these three sections, inflowing combustion product as illustrated by the arrows 56 is distributed and channeled toward the substrate 16, and specifically toward a face 60 of the substrate 16 so that the flow of combustion product 56 is substantially evenly distributed across the face 60 of the substrate 16 without a significant pressure drop penalty.

Specifically, it has been found that by providing the transition section 40 which defines the second flow-conducting chamber 42 which has a substantially constant cross-sectional area between the first flow-conducting chamber 34 which has an increasing cross-section area and the third flow-conducting chamber 38 which also has an increasing cross-sectional area, and by placing the flow diverting member 28 either in or substantially near the constant cross-sectional area, the flow distribution of the combustion product 56 is greatly enhanced with the flow of the combustion product 56 distributed across at least 95% of the inlet face 60 of the substrate 16. Importantly, this desirable distribution of flow is achieved without any significant back pressure buildup within the inlet nozzle 10 or inlet pipe 14. It will be understood by those skilled in the art that it is highly desirable to eliminate any back pressure buildup in exhaust components such as exhaust processor assemblies to maintain desirable levels of engine efficiency and performance.

Figure 2:
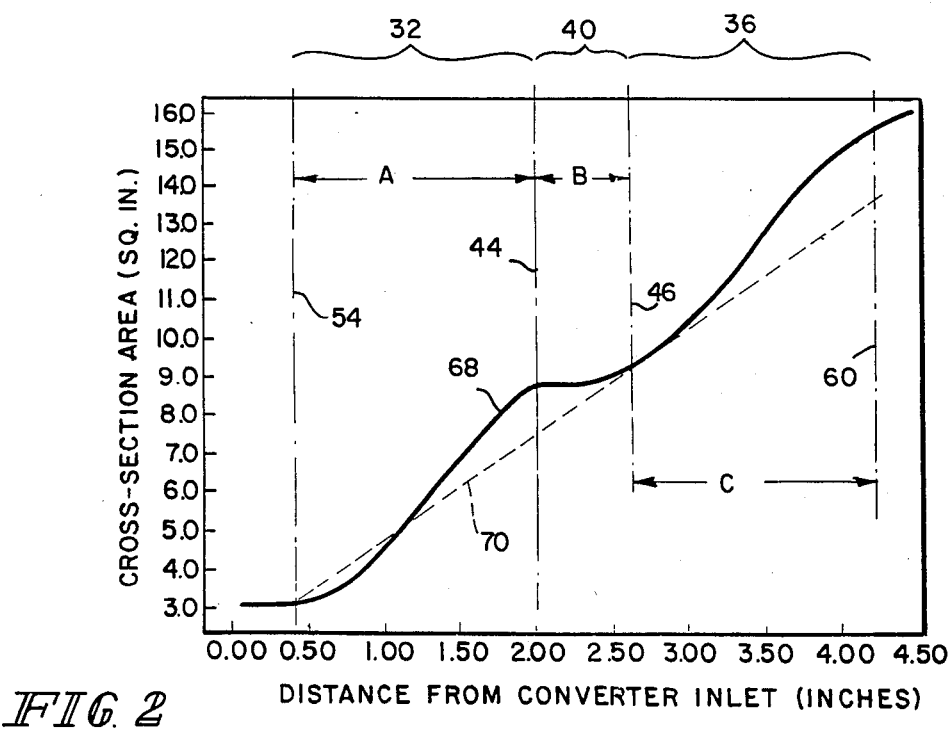
FIG. 2 is a graph showing the cross-sectional area of each section of the inlet nozzle of FIG. 1.

FIG. 2 illustrates graphically the dimension of the cross-sectional area (square inches) of each portion of the inlet nozzle 10 as a function of the distance of such area from a plane 54 oriented to divide the open mouth 52 of the inlet pipe 14 and the inlet nozzle 10. Specifically, FIG. 2 shows the relationship of the cross-sectional areas of the three sections 32, 40, and 36. The cross-sectional area in each of these sections is indicated by the heavy line 68. In addition, FIG. 2 includes a dotted line 70 which indicates a linear change in cross-sectional area.

While the present invention incorporates two successive increasing cross-sectional areas 32, 36, with a substantially constant cross-sectional area 40 interposed therebetween, it has been found that it is advantageous for the cross-sectional area of the inlet 10 as indicated by the heavy line 68 to approach as closely as feasible the dotted line 70 representing a linear change in cross-sectional area, especially in the constant cross-sectional area section 40. As can be seen in FIG. 2, the cross-sectional area in section 40 does not depart dramatically from a linear change of cross-sectional area in this area as indicated by the dotted line 70.

As can be seen in FIG. 2, the cross-sectional area of the first diverging nozzle section 32 increases substantially constantly from the plane 54 to a location approaching the first interface plane 44. Likewise, the cross-sectional area of the second diverging nozzle section 36 increases at a substantially constant rate from the second interface plane 46 toward the inlet mouth of substrate 16. The cross-sectional area of the transition section 40 is substantially constant in the area between the first interface plane 44 and the second interface plane 46. FIG. 2 represents the measured cross-sectional area of an embodiment of the invention and does not reflect absolutely the ideal cross-sectional area of transition section 44. Although the cross-sectional area within the transition section 40 in one preferred embodiment is not absolutely constant between the first interface plane 44 and the second interface plane 46, ideally, in accordance with the present invention, the cross-sectional area approaches a constant figure in this section. However, a desired relationship between the increasing cross-sectional area sections 32 and 36 and the substantially constant cross-section area section 40 is illustrated in FIG. 2.

Figure 3:
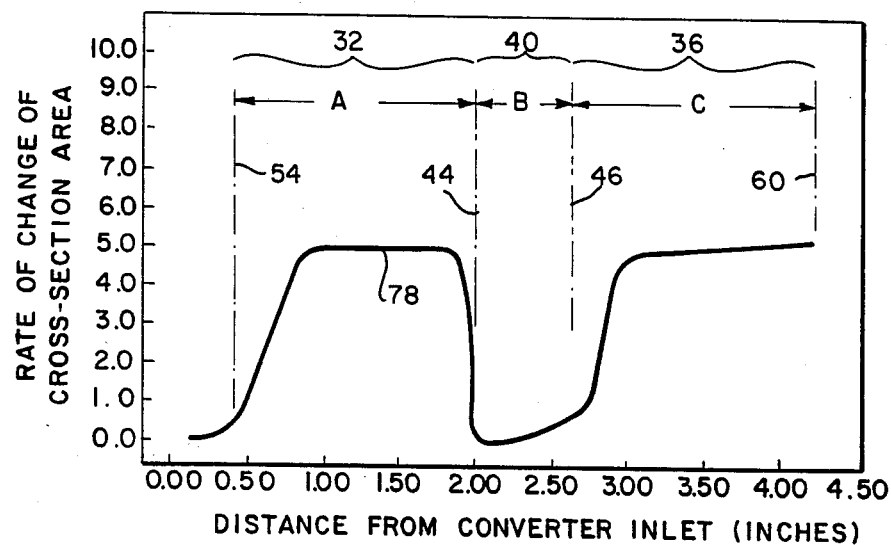
FIG. 3 is a graph showing the rate of change of the cross-sectional area of each section of the inlet nozzle of FIG. 1.

FIG. 3 shows a representation of the rate of change of the cross-sectional area within each of the three sections 32, 36, and 40. Specifically, the rate of change of the cross-sectional area is represented by the heavy line 78 which illustrates that the cross-sectional area within sections 32 and 36 increases at a generally constant rate, while the cross-sectional area within the transition section 40 remains substantially constant. It is this relationship between the constant cross-sectional area transition section 40 and the two diverging nozzle sections 32, 36 with increasing cross-sectional area, and the placement of the flow diverting member 28 that provides the advantageous functioning of the inlet nozzle 10 of the present invention.

Specifically, with the flow diverting member 28 located in or substantially near the substantially constant cross-sectional area transition section 40, the flow of combustion product 56 toward the face 60 of the substrate 16 will be substantially evenly distributed across the entire area of the face 60. As discussed previously, this provides for increased length of operation of the substrate 16, as well as better processing of the combustion product 56.

Figure 4:
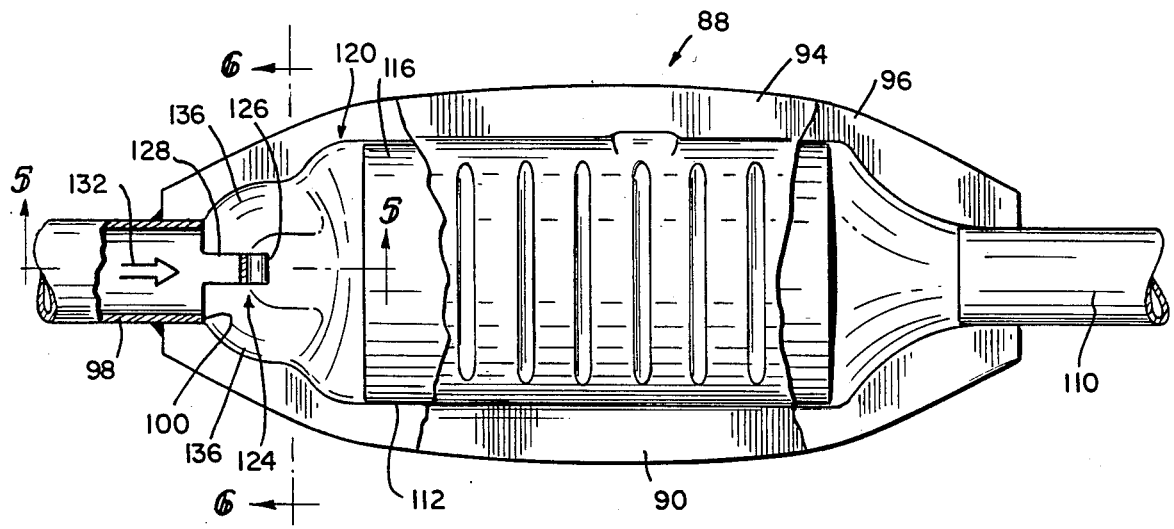
FIG. 4 is a top plan view of an exhaust processor assembly Constructed according to the present invention with portions broken away.

Referring now to FIG. 4, FIG. 4 illustrates in detail a preferred embodiment of an exhaust processor assembly 88 utilizing the structural concepts illustrated in FIGS. 1-3. Specifically, FIG. 4 illustrates the exhaust processor assembly 88 which embodies the concept of an inlet nozzle utilizing three chambers and a flow diverter mounted within the inlet such that the specific shape of the inlet and location the diverter cooperate to distribute the flow of combustion product evenly across the face of a substrate element.

The exhaust processor assembly 88 includes a housing 90 of a known clamshell type. The clamshell housing 90 includes an upper clamshell portion 94 which is mated to a lower clamshell portion 96. It will be understood that the upper clamshell portion 94 and the lower clamshell portion 96 may be joined together by any conventional method such as welding, etc. The assembly 88 includes an inlet pipe 98 which is in fluid communication with an internal combustion engine (not shown) and which receives a combustion product from the engine. The inlet pipe 98 includes an open mouth 100 which is in fluid communication with the assembly 88. An outlet pipe 110 is formed on the end of the assembly 88 opposite the inlet pipe 98. The outlet pipe 110 is used to transmit the processed combustion product away from the assembly 88 and into other components of the exhaust system of the vehicle (none of which are shown).

The joined upper and lower clamshell portions 94, 96 cooperate to form an internal cavity 112 in which a substrate 116 is disposed. The substrate 116 is a monolithic cellular structure of conventional cross-sectional area and length. The substrate may be of the type used in a catalytic reactor or, alternatively, may be of the type used in a diesel particulate trap without departing from the scope of the present invention.

An inlet nozzle 120 is provided intermediate the open mouth 100 of the inlet pipe 98 and the substrate 116. The inlet nozzle 120 is formed according to the dimensional requirements illustrated in FIGS. 1-3, and includes two increasing cross-sectional area portions with a substantially constant cross-sectional area portion interposed therebetween. A flow diverting member 124 is positioned within the inlet nozzle 120 substantially at a location illustrated in FIG. 1, that is in or substantially near the constant cross-sectional area portion. The flow diverting member 124 includes a modified "S-shaped" strap 126 which is mounted in spaced-apart relation to the open mouth 100 of the inlet pipe 98. Support frames 128 are provided for supporting the strap 126 directly to the open mouth 100 of the inlet pipe 98 in this spaced-apart relation. The mounting of the strap 126 is best illustrated in FIG. 5.

Combustion product (not shown) enters the assembly 88 through the inlet pipe 98 as illustrated by the flow direction arrow 132. As described above, the combustion product is distributed by the cooperation of the strap 126 and the specific shape of the inlet nozzle 120 such that the combustion product is distributed substantially evenly across the face of the substrate 116. It is the cooperation of the flow diverting member 124, or specifically the strap 126, and the specific relationships of the shapes and cross-sectional areas of the three distinct portions of the inlet nozzle 120 that accomplishes the distributed flow of the combustion product across the substrate 116. This provides for advantageous use of the entire surface area of the substrate 116, and lengthens the useful life of the substrate 116 considerably.

Figure 5:
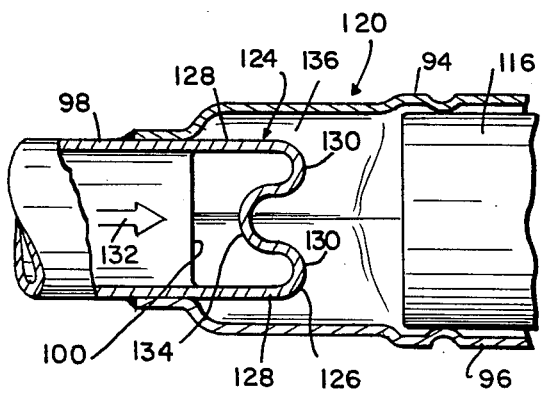
FIG. 5 is an enlarged cross-sectional view taken along lines 5—5 of FIG. 4.

FIG. 5 illustrates in greater detail the mounting of the strap 126 in the inlet nozzle 120, and its relationship to the open mouth 100 of the inlet pipe 98 and the substrate 116. Specifically, the strap 126 includes two outwardly facing, downstream protrusions 130 which face the substrate 116 and a single inwardly projecting upstream protrusion 134 which faces the open mouth 100 of the inlet pipe 98. It has been found to be advantageous to provide these three protrusions to affect a better distribution of the combustion product as it progresses toward the substrate 116.

As stated above, the two support frames 128 are connected directly to the open mouth 100 of the inlet pipe 98 by any conventional means, such as welding, etc. The two support frames 128 are integral with the strap 126, and illustratively are formed as a single unit with the strap 126. By supporting the flow diverting member 124, and specifically the strap 126, directly from the inlet pipe 98, the construction of the exhaust processor assembly 88 is easier and more cost effective.

Because of the relative size of the strap 128 compared to the cross-sectional area of the open mouth 100 of the inlet pipe 98, and because of the spaced-apart placement of the strap 126 with respect to the open mouth 100, the out-flow of combustion product from the inlet pipe 98 is permitted to enter the inlet nozzle 120 with no appreciable buildup of back pressure within the inlet pipe 98. As discussed previously, this is advantageous for several reasons, primarily to enhance engine efficiency and performance.

Figure 6:
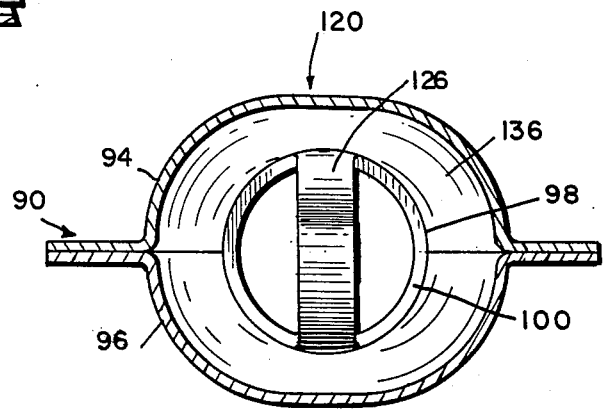
FIG. 6 is an enlarged cross-sectional view taken along lines 6—6 of FIG. 4.

FIG. 6 illustrates in greater detail the relationship between the size of the strap 126 and the cross-sectional area of the open mouth 100 of the inlet pipe 98. Specifically, it can be seen in FIG. 6 that the area of the strap 126 is substantially smaller than the cross-sectional area of the open mouth 100. The relationship between the size or area of the strap 126 and the cross-sectional area of the open mouth 100, combined with the spaced-apart placement of the strap 126 with respect to the open mouth 100, combine to virtually eliminate any potential back pressure being created in the inlet pipe 98 due to the flow diverting function of the strap 126.

To support the assertion that an inlet cone for an exhaust processor assembly formed according to the present invention provides for a more uniform flow of incoming combustion product over the face of a substrate, applicant has performed tests on various types of inlet cones to provide comparative data which illustrates the velocity distribution of combustion product across the surface of various configurations of inlet cones. It will be understood that the measurement of the velocity distribution of an incoming combustion product across the face of a substrate is an accurate method of determining the uniformity of the flow across the face of a substrate. The results of the comparative tests are illustrated in FIGS. 7-10, with a compilation of a pertinent portion of the comparative data illustrated in FIG. 11.

Specifically, FIGS. 7-10 are graphs which illustrate the relative velocity distribution in percentage of overall flow of the combustion product across the face of a 3.4 inch by 5.0 inch cross section substrate. The x-axis of each of the graphs illustrated in FIGS. 7-10 reflects the velocity distribution of the relative exhaust velocity with respect to the average measured velocity. It will be understood that in an optimum velocity distribution, a substantial portion of the percentage of overall flow would be centered around the average velocity, or at 1.00 on the x-axis. Thus, as the velocity distribution approaches an optimum distribution, the percentage of overall flow centered at 1.00 will increase.

Figure 7:
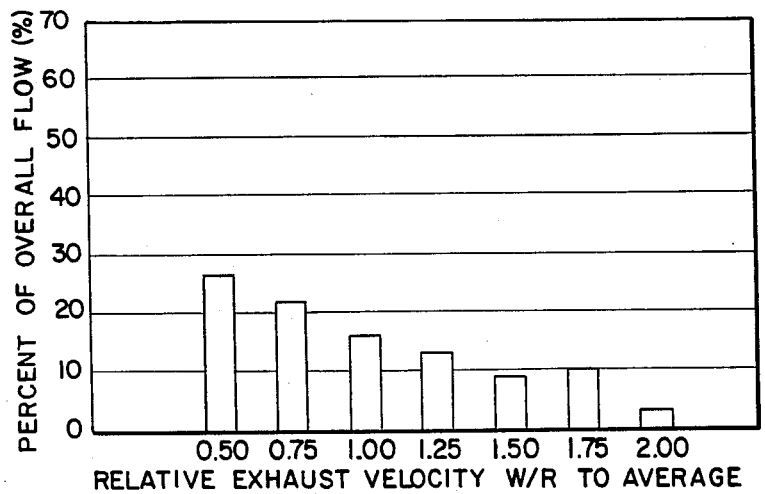
FIG. 7 is a graphic depiction of the measured data of the velocity distribution of a straight cone without a diverter.

FIG. 7 illustrates the velocity distribution in terms of percentage of overall flow for a straight sided cone without a diverter installed at 200 standard cubic feet per minute flow rate. The data in FIG. 7 illustrates that only approximately 15-18 percent of the measured overall flow occurred at the average velocity. Also, the measured velocities ranged from one-half the average up to two times the average which indicates a less than desirable velocity distribution across the face of the substrate. Thus, this test data indicates that a straight sided cone without a diverter produces a generally undesirable flow distribution across the face of a substrate, with a wide range of relative velocities compared to an average velocity.

Figure 8:
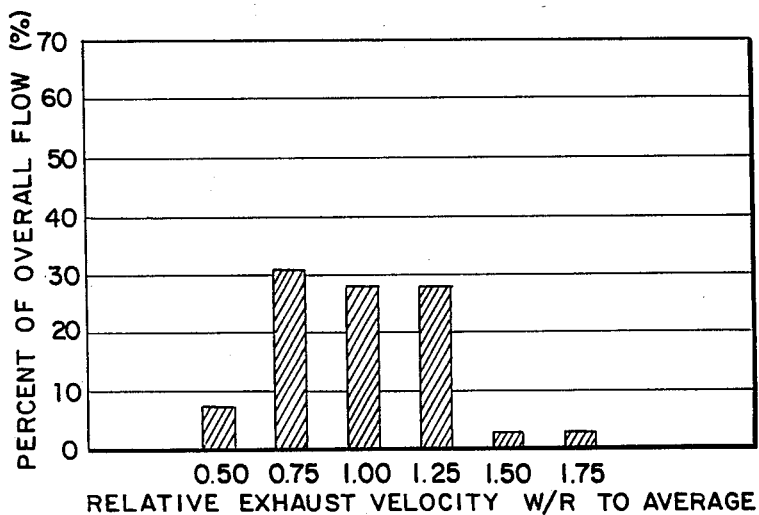
FIG. 8 is a graphic depiction of the measured data of the velocity distribution of a straight cone with a diverter.

FIG. 8 illustrates measured data for the velocity distribution of a straight sided cone with a diverter installed. Again, the flow rate for the test was 200 standard cubic feet per minute through the cone. FIG. 8 illustrates that although the installation of the diverter provided for an improved velocity distribution, only approximately 28 percent of the overall flow was measured at the average velocity. Although this is an improvement over the data for the cone without a diverter in FIG. 7, this velocity distribution is also generally unsatisfactory because of the range of velocities from one-half the average velocity to 1.75 times the average velocity, with a relatively low percentage of the flow occurring at the average velocity. Thus, although the diverter improved the velocity distribution across the face of the substrate somewhat, such a configuration still resulted in a generally undesirable flow distribution across the substrate.

Figure 9:
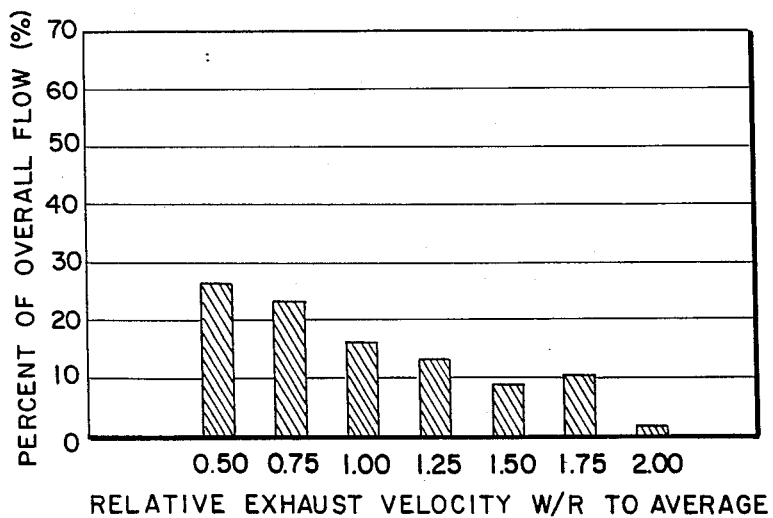
FIG. 9 is a graphic depiction of the measured data of the velocity distribution of a chambered cone without a diverter.

FIG. 9 illustrates the velocity distribution of a cone formed to include chambers as specified in the present application, however without the inclusion of a diverter in the cone. Again, the test was conducted at 200 standard cubic feet per minute flow rate. FIG. 9 illustrates that a chambered cone without a diverter results in negligible improvement over the data for the straight sided cone without a diverter as illustrated by the data in FIG. 7. Thus, simply forming the inlet cone to include chambers does not significantly improve the overall velocity distribution across the face of the substrate.

Figure 10:
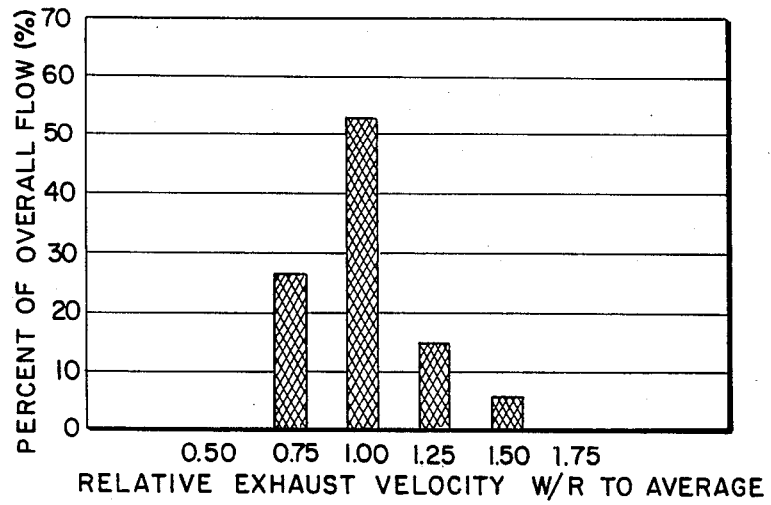
FIG. 10 is a graphic depiction of the measured data of the velocity distribution of a chambered cone with a diverter according to the present invention.

FIG. 10 illustrates the velocity distribution of a chambered cone configured according to the present invention with a diverter disposed within the cone. Thus, the configuration utilized to provide the data in FIG. 10 corresponds generally to the preferred embodiment of the invention. Again, the test was conducted at 200 standard cubic feet per minute flow rate. As can be seen in FIG. 10, greater than 50 percent of the overall flow occurred at the average velocity which corresponds to a significant improvement over the velocity distribution of the previously described three configurations. Also, the range of the relative velocities advantageously decrease to between three quarters of the average to 1.5 times the average. This small range, combined with the significantly high a percentage of flow at the average velocity reflects significantly improved flow distribution across the face of the substrate.

Figure 11:
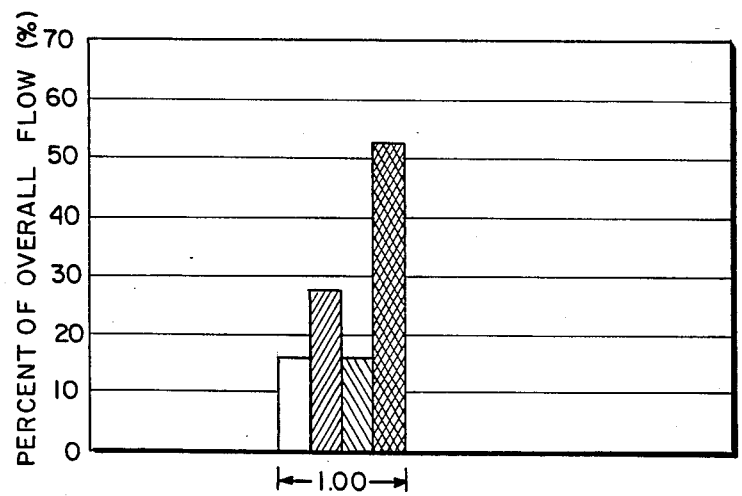
FIG. 11 is a graphic depiction comparing the percentage of flow at the average velocity for the four configurations illustrated in FIGS. 7-10.

FIG. 11 illustrates the increase in the percentage of overall flow at the average velocity provided by a cone configured according to the present invention with a diverter installed. Specifically, FIG. 11 compares the percentage of overall flow measured at the average velocity for each of the four configurations described above. FIG. 11 illustrates clearly that the configuration of a chambered cone with a diverter installed significantly improves the flow distribution across the substrate.

Figure 12:
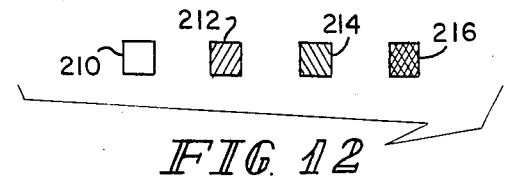
FIG. 12 is a reference legend identifying the data for the four embodiments illustrated in FIGS. 7-10.

FIG. 12 is a reference legend which is included for descriptive purposes to show the distinctions between the presentations of data for the four embodiments illustrated in FIGS. 7-10, and the compilation of the data illustrated in FIG. 11. It will be understood that FIG. 12 is included for legend purposes only, and is not part of the data of the present invention.

Figure 13:
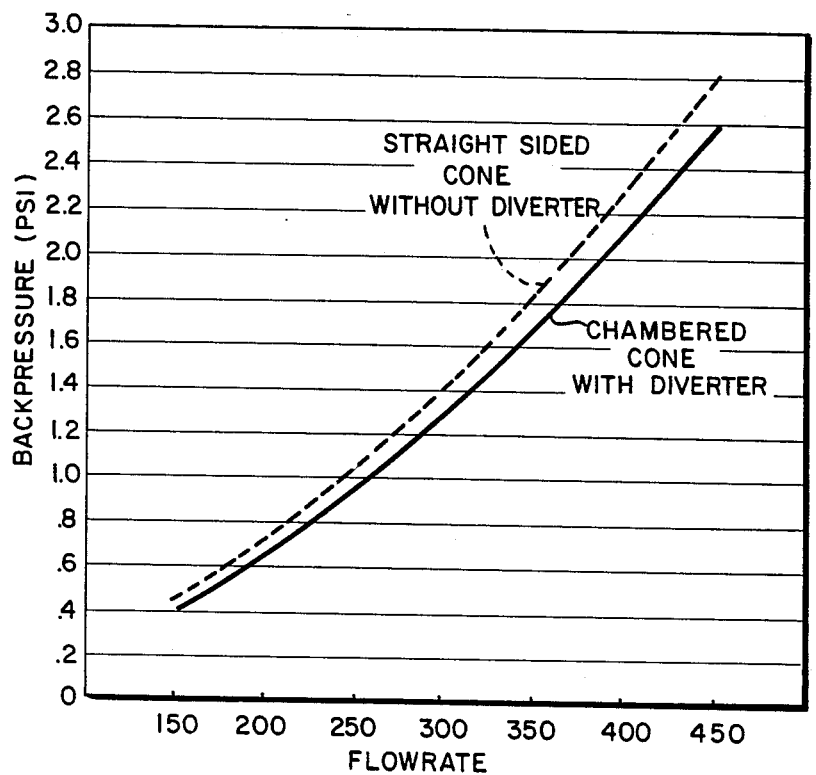
FIG. 13 is a graph comparing the back pressure values at selected flow rates for a straight cone without a diverter and a chambered cone with a diverter.

FIG. 13 illustrates that the improved flow distribution provided by the chambered cone with the diverter installed significantly improves the flow distribution across the substrate without any significant increase in back pressure due to the presence of the chambered cone or the diverter. As stated previously, an increase in back pressure decreases engine performance and efficiency, and is generally not desirable. The inlet cone of the present invention advantageously improves the velocity distribution across the substrate without such a detrimental back pressure increase.

The comparative data presented in FIGS. 7-11, and the data related to back pressure illustrated in FIG. 13 clearly illustrate that a inlet cone configured according to the present invention provides for significantly improved performance over other configurations of inlet cones. This improved performance provided by the inlet cone of the present invention is provided without any penalty due to back pressure increase.

Although the invention has been described in detail with reference to preferred embodiments and specific examples, variations and modifications exist within the scope and spirit of the invention as described and defined in the following claims.

What is claimed is:

1. An exhaust processor assembly for processing a flow of combustion product supplied by a source means, the assembly comprising
    a housing including inlet means coupled to the source means for admitting combustion product traveling in a certain flow direction into the housing and outlet means for exhausting combustion product from the housing,
    substrate means positioned in the housing in downstream relation to the inlet means for treating combustion product admitted into the housing through the inlet means, the inlet means having a longitudinal axis and extending between the source means and the substrate means to define a predetermined axial dimension along the longitudinal axis, the inlet means including first diverging nozzle means communicating with the source means for providing an increase in the cross-sectional area of the inlet means in the flow direction over a first predetermined axial distance, second diverging nozzle means communicating with the substrate means for providing an increase in the cross-sectional area of the inlet means in the flow direction over a second predetermined, axial distance, and transition means interconnecting the first and second diverging nozzle means in fluid communication for providing a substantially uniform cross-sectional area of the inlet means in the flow direction over a third predetermined axial distance, the summation of the first, second, and third predetermined axial distances being substantially equivalent to the predetermined axial dimension of the inlet means, and
    diverter means positioned in the inlet means for interrupting the flow of combustion product traveling through the inlet means toward the substrate means, the inlet means and the diverter means cooperating to provide distribution means for substantially uniformly distributing the flow of combustion product introduced into the housing across the inlet face of the substrate, thereby providing a distributed exhaust flow designed to load the substrate means substantially evenly to enhance combustion product treatment efficiency of the substrate means.

2. The assembly of claim 1, wherein the first diverging nozzle means defines a first flow-conducting chamber, the transition means defines a second flow-conducting chamber, and the diverter means is positioned to extend into both of the first and second flow-conducting chambers.

3. The assembly of claim 2, wherein the second diverging nozzle means defines a third flow-conducting chamber and the diverter means is positioned in spaced-apart relation to the third flow-conducting chamber.

4. The assembly of claim 1, wherein the first diverging nozzle means and the transition means cooperate to define an interface plane therebetween and the diverter means is positioned at about the interface plane.

5. The assembly of claim 1, wherein the source means is an inlet pipe defining an open mouth having a cross-sectional area and the diverter means includes a flow-interrupting member having a flow-receiving face and support means coupled to the inlet pipe for suspending the flow-interrupting portion in the inlet means in spaced relation to the inlet pipe to position the flow-receiving face in spaced-apart, confronting relation to the open mouth of the inlet pipe to intercept combustion product admitted into the inlet means, the flow-receiving face having a surface area that is substantially less than the cross-sectional area of the open mouth so that back pressure in the inlet pipe is minimized.

6. The assembly of claim 5, wherein the flow-interrupting member is an elongated strap, the support means includes first and second elongated frame members situated in substantially spaced-apart parallel relation, the first elongated frame member interconnects the inlet pipe and one end of the elongated strap, and the second elongated frame member interconnects the inlet pipe and the other end of the elongated strap.

7. The assembly of claim 5, wherein the inlet means includes an interior wall configured to define the first and second diverging nozzle means and the transition means, and the flow-interrupting member is positioned to divide the flow of combustion product admitted into the inlet means into at most separate first and second flow streams intermediate the flow-receiving face and the interior wall of the inlet means.

8. The assembly of claim 1, wherein the first predetermined axial distance is about 33–45% of the predetermined axial dimension.

9. The assembly of claim 1, wherein the second predetermined axial distance is about 33–45% of the predetermined axial dimension.

10. The assembly of claim 1, wherein the third predetermined axial distance is about 10–33% of the predetermined axial dimension.

11. An exhaust processor assembly for an engine, the assembly comprising
    a longitudinally extending housing formed to include an inlet and an outlet,
    a substrate within the housing having an entry end facing toward the housing inlet, the housing inlet being formed to include a first diverging transaxial cross section and then a progressively larger second diverging transaxial cross section opening toward the substrate entry end,
    means for diverting the exhaust product, the diverter means being disposed generally in the housing inlet, the housing inlet further including transition means interconnecting the first and second diverging transaxial cross sections for providing a substantially uniform cross-sectional area.

12. The assembly of claim 11, wherein the first diverging transaxial cross section defines a first flow-conducting chamber, the transition means defines a second flow-conducting chamber, and the diverter means is being positioned to extend into both of the first and second flow-conducting chambers.

13. The assembly of claim 12, wherein the second diverging transaxial cross section defines a third flow-conducting chamber and the diverter means is positioned in spaced-apart relation to the third flow-conducting chamber.

14. The assembly of claim 11, wherein the first diverging transaxial cross section and the transition means cooperate to define an interface plane therebetween and the diverter means is positioned at about the interface plane.

15. An exhaust processor assembly for an engine, the assembly comprising
 a longitudinally extending housing formed to include an inlet and an outlet,
 a substrate within the housing having an entry end facing toward the housing inlet, the housing inlet being formed to include a first diverging transaxial cross section and then a progressively larger second diverging transaxial cross section opening toward the substrate entry end,
 means for diverting the exhaust product, the diverter means being disposed generally in the housing inlet, and
 source means for introducing combustion product into the housing inlet, the source means including an inlet pipe defining an open mouth having a cross-sectional area and the diverter means including a flow-interrupting member having a flow-receiving face and support means coupled to the inlet pipe for suspending the flow-interrupting member in the inlet means in spaced relation to the inlet pipe to position the flow-receiving face in spaced-apart, confronting relation to the open mouth of the inlet pipe to intercept combustion product admitted into the inlet means, the flow-receiving face having a surface area that is substantially less than the cross-sectional area of the open mouth so that back pressure in the inlet pipe is minimized, the flow-interrupting member being an elongated strap, the support means including first and second elongated frame members situated in substantially spaced-apart parallel relation, the first elongated frame member interconnecting the inlet pipe and one end of the elongated strap, and the second elongated frame member interconnecting the inlet pipe and the other end of the elongated strap.

16. The assembly of claim 15, wherein the housing inlet includes an interior wall configured to define the first and second diverging transaxial cross sections, and the flow-interrupting member is positioned to divide the flow of combustion product admitted into the housing inlet into at most separate first and second flow streams intermediate the flow-receiving face and the interior wall of the inlet means.

* * * * *